(12) United States Patent
Stimac

(10) Patent No.: US 8,589,520 B2
(45) Date of Patent: *Nov. 19, 2013

(54) NETWORK MERGE TESTING

(75) Inventor: Michael D. Stimac, Pacifica, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 3 days.

This patent is subject to a terminal disclaimer.

(21) Appl. No.: 13/251,810

(22) Filed: Oct. 3, 2011

(65) Prior Publication Data

US 2012/0030321 A1   Feb. 2, 2012

Related U.S. Application Data

(63) Continuation of application No. 10/284,434, filed on Oct. 30, 2002, now Pat. No. 8,055,731.

(51) Int. Cl.
*G06F 15/177* (2006.01)
(52) U.S. Cl.
USPC ............................ 709/220; 709/224; 709/249
(58) Field of Classification Search
USPC ................... 709/224, 223, 249, 220–222
See application file for complete search history.

(56) References Cited

U.S. PATENT DOCUMENTS

| | | | | |
|---|---|---|---|---|
| 6,243,747 B1 * | 6/2001 | Lewis et al. | | 709/220 |
| 6,546,424 B1 * | 4/2003 | Cucchiara | | 709/226 |
| 6,981,065 B1 * | 12/2005 | Lu | | 709/251 |
| 7,096,264 B2 * | 8/2006 | Bonney et al. | | 709/224 |
| 7,120,683 B2 * | 10/2006 | Huang | | 709/223 |
| 7,711,831 B2 * | 5/2010 | Aiken et al. | | 709/228 |
| 7,752,294 B2 * | 7/2010 | Meyer et al. | | 709/223 |
| 8,055,731 B2 * | 11/2011 | Stimac | | 709/220 |
| 2002/0046271 A1 * | 4/2002 | Huang | | 709/223 |
| 2002/0178265 A1 * | 11/2002 | Aiken et al. | | 709/227 |
| 2003/0051026 A1 * | 3/2003 | Carter et al. | | 709/224 |
| 2004/0073712 A1 * | 4/2004 | Larson et al. | | 709/249 |
| 2004/0148380 A1 * | 7/2004 | Meyer et al. | | 709/223 |

OTHER PUBLICATIONS

Cisco Systems, Inc. "Cisco Fabric Manager," Copyright 1992-2002, Posted on Web Aug. 20, 2002, 10 pages.

* cited by examiner

*Primary Examiner* — Kenneth R Coulter
(74) *Attorney, Agent, or Firm* — Conley Rose, P.C.

(57) ABSTRACT

A method and system for performing network merge testing are disclosed. In one embodiment, the network merge testing method comprises: (i) gathering configuration information from at least two networks; (ii) comparing the configuration information; and (iii) displaying a report that indicates whether an attempted merge of the at least two networks would succeed. The report preferably identifies conflicts between the network configurations, and the method may further include automatic or guided resolution of the conflicts. The configuration information may include: zone names and memberships; domain and port names; security settings; inter-op modes; and long distance modes. A system for implementing the method is also disclosed herein. The system and method may advantageously prevent or diagnose causes of network segmentation.

19 Claims, 2 Drawing Sheets

NETWORK MERGE TESTING

BACKGROUND

Computer networks facilitate communication between computers, and between computers and stand-alone peripherals. They make possible large scale computing systems, distributed service systems, and a whole host of applications that would otherwise be infeasible. Thus, incentives exist for the use and enhancement of computer network technology. As computer networks increase in speed and size, they require more sophisticated protocols to ensure fast and reliable communications. Network configuration and supervision are increasingly important parts of these protocols.

Storage area networks (SANs) are a popular type of computer network. SANs are networks of stand-alone data storage devices (e.g. disk drives). The SAN is usually a subnetwork of a larger computer network that includes servers and personal computers. The advantages of SANs include having a large, shared storage capacity that has a high bandwidth access and does not have to be accessed through a server.

Many SANs rely on the Fibre Channel (FC) protocol. A single FC link can carry data at rates exceeding 2 gigabits per second (Gb/s) in both directions simultaneously. The FC protocol defines standard media and signaling conventions for transporting data in a serial fashion. It also provides an error correcting channel code and a frame structure for transporting the data. Further, the FC protocol sets out a buffer-credit-based flow control methodology, and creates some common services (e.g. fabric controller, name server). The FC protocol can be applied to various network topologies including point-to-point, ring, and switched fabric. Further details regarding the FC protocol can be found online at www.fibrechannel.org.

Switched fabric topologies are networks of switches that interconnect end-node devices. Well-designed switches provide at least some degree of automatic configurability. For example, they may automatically sense when a new link is connected to the switch, and may initiate an initialization process to discover what the link connects to. The switch may automatically determine various parameters for the link (e.g. link speed). Other parameters, however, have a more global effect and may not be automatically configurable by the switch. Examples may include zone names, domain names, port names, port identifier lengths, time-out values, security settings, inter-op modes, and long-distance modes. When the link connects switches in two otherwise separately operating fabrics, a mismatch in any of these parameters will prevent communication over the link. Network segmentation is the term for this phenomena: a physically connected network operating as multiple, separate networks.

Of course, network segmentation is undesirable when one wishes to merge the separate networks into a single unified network. It would be desirable to have a tool that determines whether a network merge will be successful and/or determines the causes of existing network segmentation.

SUMMARY

Accordingly, a method and system for performing network merge testing are disclosed. In one embodiment, the network merge testing method comprises: (i) gathering configuration information from at least two networks; (ii) comparing the configuration information; and (iii) displaying a report that indicates whether an attempted merge of the at least two networks would succeed. The report preferably identifies conflicts between the network configurations, and the method may further include automatic or guided resolution of the conflicts. The configuration information may include: zone names and memberships; domain and port names; security settings; inter-op modes; and long distance modes. A system for implementing the method is also disclosed herein. The system and method may advantageously prevent or diagnose causes of network segmentation.

BRIEF DESCRIPTION OF THE DRAWINGS

A better understanding of the present invention can be obtained when the following detailed description of the preferred embodiment is considered in conjunction with the following drawings, in which.

Figure 1:
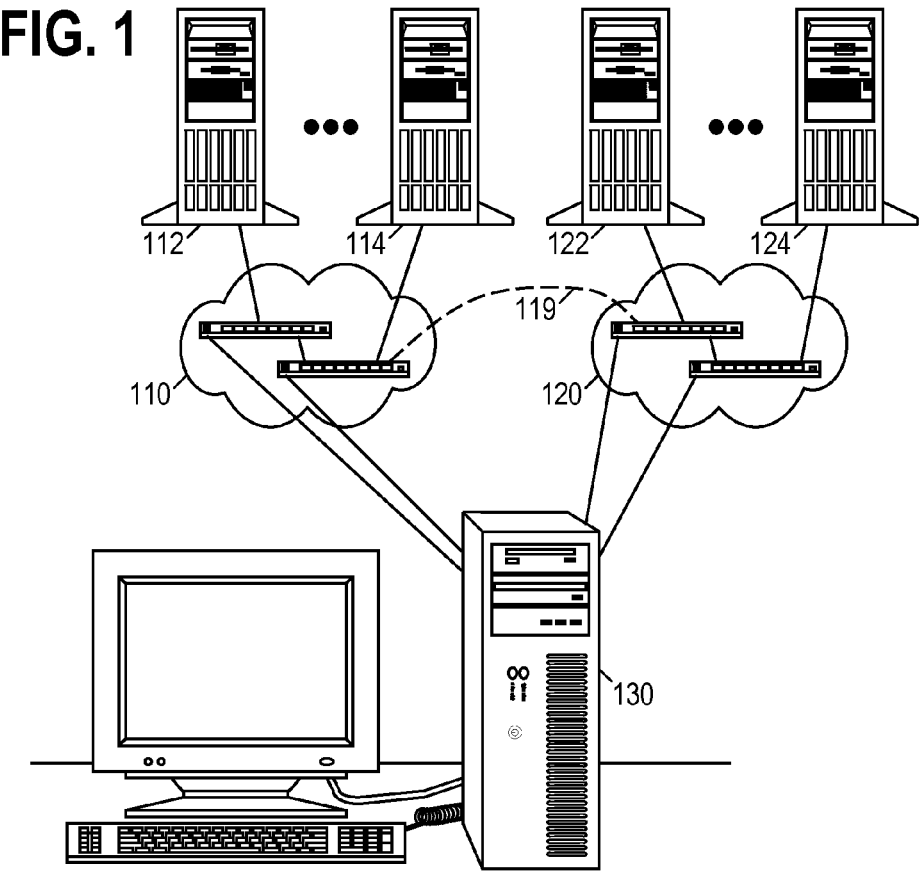
FIG. 1 shows a separately operating networks that are to be merged.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to the figures, FIG. 1 shows two switched Fibre Channel (FC) fabrics 110, 120 that each include a plurality of switches. The switches of fabric 110 transport communications between end nodes 112-114, and the switches of fabric 120 transport communications between end nodes 122-124. A network management system 130 is preferably coupled to each of the switches in the fabrics 110, 120. The coupling may be accomplished in any number of ways, including: connecting the system 130 to each of the fabrics as an end node device; and connecting the system 130 to each of the switches using Ethernet connections or some other form of computer network.

It is presumed, though by no means necessary, that the fabrics 110, 120 have been installed and operated separately, and that it is now desired to merge the fabrics together. In FIG. 1, this merging is represented by inter-switch link (ISL) 119. Potentially, the physical installation of ISL 119 may be enough to merge the fabrics into a single whole. However, for the reasons described in the background, chances are good that the merge will fail, and the fabrics will continue to operate independently. Accordingly, system 130 is preferably configured to perform network merge testing, either before physically connecting the fabrics, or after the attempted merge has failed.

Figure 2:
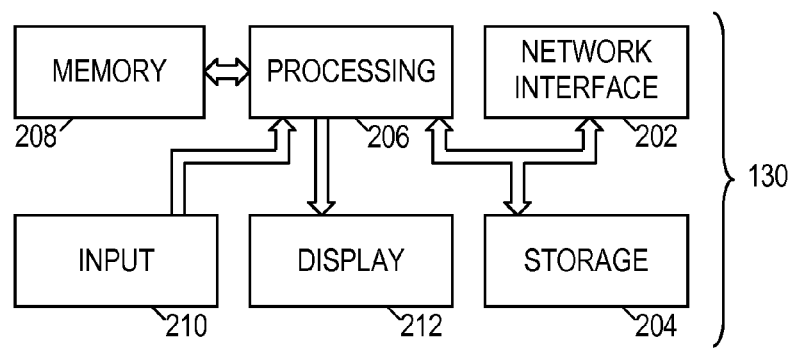
FIG. 2 shows a functional block diagram of network management system hardware.

FIG. 2 shows a functional block diagram of a preferred network management system 130. The system preferably includes an interface module 202 that allows access to configuration information for each of the switches in the fabrics being monitored. Interface module 202 may simply be a network interface card, or it may be a host bus adapter (HBA). Other suitable implementations may be used. The interface module 202 preferably operates under control of processing module 206 to retrieve switch configuration information and to store the switch configuration information in storage module 204.

Storage module 204 maintains a copy of the configuration information for access by the processing module 206. Storage module 204 may take the form of dynamic random access memory (DRAM), static random access memory (SRAM), Flash ROM (read only memory), optical storage media, magnetic storage media, or any combination thereof. Note that storage module 204 (or a portion thereof) may be removable so as to be portable between systems. Storage module 204 may further maintain a copy of software for analyzing the configuration information as described further below.

Processing module 206 accepts instructions from a user via input module 210, and responsively performs network merge testing on the configuration information from storage module 204. To perform the network merge testing, the processing module 206 may use a memory module 208 for temporary storage of software instructions and configuration information. Results of the network merge testing may be displayed in some form to the user by display module 212.

Figure 3:
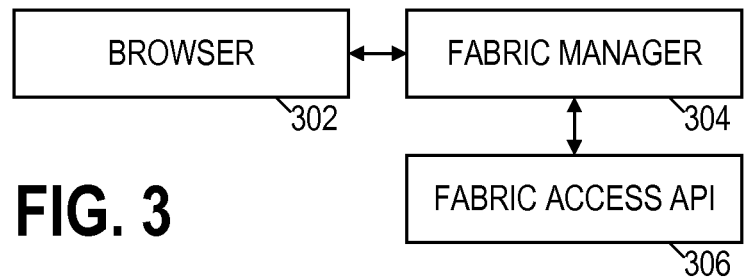
FIG. 3 shows a functional block diagram of network management system software.

Software in the network management system 130 is preferably implemented as shown in FIG. 3. A browser application 302 preferably presents a graphical user interface (GUI) through which a user can locate and trigger a fabric manager application 304. The fabric manager application is preferably a Java Application, which runs in the operating system environment rather than being contained within the browser environment. To enable this, a plug-in may be employed such as Sun's Java Web Start Plug-in, which enables Java Applications to be launched from a web browser, e.g. by clicking on a uniform resource locator (URL) link in an hyper-text markup language (HTML) web page. An alternative method of enabling execution outside the browser environment would be to use a single-file installer. Clicking on a link would cause the single-file installer to be downloaded to a local disk drive. The user would then need to take the extra step of leaving the browser environment to execute the installer, which in turn installs and executes the fabric manager application 304.

The fabric manager application 304 provides the user with a GUI through which the user can obtain configuration information from switches in one or more fabrics. The fabric manager application 304 accesses the switch configuration information through a fabric access interface 306. The fabric access interface 306 may preferably comprise software procedure calls that cause the system's interface module 202 to transmit properly-formatted inquiries to the switches and to convey their responses. The switches may each be provided with unique network addresses to facilitate such access.

The fabric manager application 304 preferably automates much of the network management process by providing automated status and event logging, and by providing an alert system to notify the user of conditions needing immediate attention. It preferably supports the simultaneous monitoring and configuration of multiple fabrics, both in terms of physical groups of switches, and in terms of user-specified logical groups. The fabric manager is preferably also able to determine and monitor the ISL configuration of each fabric.

In a preferred embodiment, the fabric manager is optionally able to initiate firmware downloads to the switches, and to conduct sequenced rebooting of the fabric switches. The user may be allowed to establish a baseline switch configuration, and to upload this baseline configuration to each of the switches. However, a user is preferably required to enter passwords for access to secure switches, or otherwise satisfy security precautions.

The fabric manager application 304 preferably provides zone and merge testing, in which the application 304 determines whether an attempted merging of multiple networks would succeed, and if not, why not. Such zone and merge testing could also be used to determine why an attempted merging of multiple networks failed. The zone and merge testing preferably checks those parameters of network operation that the switches fail to account for when configuring for merged operation with another network.

The fabric manager application 304 may optionally determine those network operation parameter settings that would allow for merging of the networks in question, and may be configured to automatically adjust those parameters in a way that would permit merging of the networks. Possible resolutions of conflicts are described below in conjunction with the discussion of network operation parameters that are examined.

The fabric manager application 304 may also optionally disable the zoning configuration of one network when the zoning configuration is in conflict with that of another network. This action may resolve zoning conflicts preventing a merge. Disabling of a zoning configuration allows that zoning configuration to be overridden by a non-disabled zoning configuration.

Figure 4:
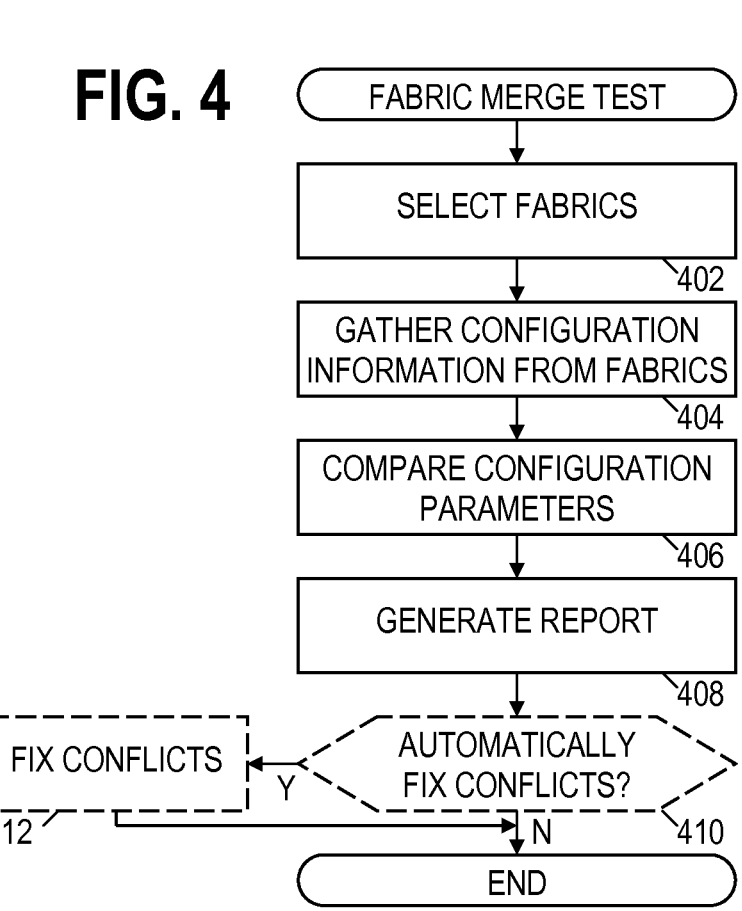
FIG. 4 shows a flowchart of a preferred network testing method.

A flowchart of a preferred zone and merge testing method is shown in FIG. 4. Before invoking the test, the user has presumably configured the fabric manager application 304 in a way that permits the fabric manager application to contact switches in multiple networks and to retrieve configuration and status information from each switch. The fabric manager application 304 presumably performed at least an initial retrieval of configuration information from each switch and stored the configuration information in a database that is stored locally, e.g. in storage module 204. The fabric manager application 304 may further have mapped the network topologies and identified each of the networks to which the network management system 130 is connected.

Beginning then in block 402, a user selects two (or possibly more) networks that the user wishes to perform zone and merge testing upon. In block 404, the fabric manager application 304 gathers the configuration information from the selected networks. This information may be gathered directly from the switches, or it may be gathered from the database. A discussion of the parameters of interest is provided below. As part of the gathering process, it may be necessary for the user to enter correct login and password information for each switch involved.

In block 406, parameter values for the different networks are compared, and in block 408, the fabric manager application generates a report. The report preferably indicates whether any conflicts were detected, and if so, preferably provides a list of the conflicts. In one embodiment, the method terminates with the generation of the report.

In a preferred embodiment, the user is given an option in block 410 to have automatic correction of the conflicts by the fabric manager application 304 in block 412. This automatic correction may eliminate conflicts by setting mismatched parameters to an equal value, and by renaming ports, domains, or zones having conflicting names. The equal value may be determined by the value used by the first or "primary" network selected for testing. Alternatively, the equal value may be determined by the best performance value supported by both networks, or by a minimum value that assures compatibility over most networks. Other approaches are also contemplated.

The renaming may be done by creating a table of currently used values, then identifying unused names absent from the table. These unused names may then be used to eliminate conflicts. Alternatively, all items may be renamed using a systematic naming system that avoids memory conflicts, e.g. by sequentially renumbering the domains when a domain name conflict is detected. Other approaches are also contemplated.

Of course, the user may prefer to adjust the parameters using the other facilities of the fabric manager application 304, rather than relying on the automated fix procedure. In summary, the user can initiate a process whereby the configurations that are currently active for each fabric will be compared to discover any incompatibilities that would generate segmentation. The user can then examine the comparison results and take corrective action, if needed, before physically linking the selected networks.

Some of the network properties that are preferably checked for Fibre Channel fabrics include: zone names, domain names, port names, port identifier lengths, time-out values, security settings, inter-op modes, and long-distance modes. Each of these is discussed separately below.

Zone names. A zoning conflict arises when one of the zones in one network is named (numbered) the same as one of the zones in the other network, but defined with a different set of members. One way to fix this conflict is to adjust the zone memberships so that the zones are defined equally. A preferred way to fix this conflict is to rename one of the zones to eliminate the conflict. Zoning conflict resolution is preferably done after all other name conflicts are resolved.

Domain names. Typically, each switch is assigned a unique domain name (number). A conflict arises if the same domain name is assigned to switches in different networks. A preferred way to fix this conflict is to rename the domain assigned to one of the conflicting switches.

Port names. Similarly, each end node is assigned a locally-unique port identifier. A conflict arises if the same port name is assigned to different ports. A preferred way to fix this conflict is to rename one of the conflicting ports.

Port identifier lengths. Certain networks may have extended port identifier lengths (i.e., the number of bits used to identify a port) that are not supported by older network switches. The newer switches in the newer network may be set to conform with the length expected by the older switches.

Time-out values. Fibre Channel networks use error-detection (ED) timeouts to determine when a data transmission error has occurred (e.g. when an expected response is not received within the timeout period), and resource allocation (RA) timeouts to determine when a network resource may be reused. A conflict arises if the ED or RA timeout values for one network do not match those of the other networks. A preferred way to resolve this conflict is to choose the network having the maximum ED time-out value and set the other network ED time-outs to that value. Similarly, the RA time-out value may be set to the maximum value used by one of the networks.

Security settings. Networks may have various security settings, such as a trusted directory server designation, or a predetermined alarm threshold. A conflict arises if the security settings are not consistent for the two networks, and any such conflict is preferably eliminated by adjusting the settings of one network to be consistent with the other.

Inter-Operability modes. Certain networks may have proprietary features that are not part of the baseline Fibre Channel standard. A conflict arises when one network is set to operate with only switches that support the non-standard features ("homogeneous network"), and another network is set to operates with different switches in accordance with the baseline standard ("heterogeneous network"). One way to fix this is to set all networks to the heterogeneous operating mode.

Long-distance modes. A long-distance mode conflict arises when one network allows communications with physically distant switches and another network does not. The resolution of this conflict may depend on whether such communications are necessary, and the preferred default may be to support for long distance communications when uncertain.

Numerous variations and modifications will become apparent to those skilled in the art once the above disclosure is fully appreciated. It is intended that the following claims be interpreted to embrace all such variations and modifications.

What is claimed is:

1. A non-transitory machine-readable storage medium comprising executable instructions that, when executed, cause one or more processors to:
receive configuration information, wherein the configuration information comprises domain name values in use in at least two networks;
identify at least one domain name value not in use;
eliminate conflicts between the at least two networks by requesting renaming of a domain to the at least one domain name value not in use.

2. The non-transitory medium of claim 1, wherein the one or more processors are caused to receive, identify, and eliminate without user input.

3. The non-transitory medium of claim 1, wherein the one or more processors are further caused to present a link that triggers a Java manager application.

4. The non-transitory medium of claim 1, wherein the configuration information further comprises zone names and the one or more processors are caused to eliminate conflicts by requesting renaming of a zone.

5. The non-transitory medium of claim 1, wherein the configuration information further comprises zone memberships and the one or more processors are caused to eliminate conflicts by requesting adjusting of a zone membership.

6. The non-transitory medium of claim 1, wherein the configuration information further comprises security settings, inter-op modes, and long distance modes.

7. A method, comprising:
receiving configuration information, wherein the configuration information comprises time-out values in use in at least two networks;
identifying the maximum time-out value in use;
eliminating conflicts between the at least two networks by requesting setting of a time-out value to the maximum time-out value.

8. The method of claim 7, wherein receiving, identifying, and eliminating are performed without user input.

9. The method of claim 7, further comprising presenting a link that triggers a Java manager application.

10. The method of claim 7, wherein the configuration information further comprises zone names and eliminating conflicts comprises requesting renaming of a zone.

11. The method of claim 7, wherein the configuration information further comprises zone memberships and eliminating conflicts comprises requesting adjusting of a zone membership.

12. The method of claim 7, wherein the configuration information further comprises domain names and eliminating conflicts comprises requesting renaming of a domain.

13. The method of claim 7, wherein the configuration information further comprises security settings, inter-op modes, and long distance modes.

14. A system, comprising:
a network interface module;
a storage module configured to store software; and
a processing module coupled to the storage module and to the network interface module, the processing module configured to retrieve and execute the software,
wherein the software configures the processing module to:
receive configuration information, wherein the configuration information comprises zone name values in use in at least two networks;
identify at least one zone name value not in use;
eliminate conflicts between the at least two networks by requesting renaming of a zone to the at least one zone name value not in use.

15. The system of claim 14, wherein the software configures the processing module to receive, identify, and eliminate without user input.

16. The system of claim 14, wherein the software further configures the processing module to present a link that triggers a Java manager application.

17. The system of claim 14, wherein the configuration information further comprises zone memberships and the software configures the processing module to eliminate conflicts by requesting adjusting of a zone membership.

18. The system of claim 14, wherein the configuration information further comprises domain names and the software configures the processing module to eliminate conflicts by requesting renaming of a domain.

19. The system of claim 14, wherein the configuration information further comprises security settings, inter-op modes, and long distance modes.

* * * * *